United States Patent
Honjo

(10) Patent No.: US 11,363,195 B2
(45) Date of Patent: Jun. 14, 2022

(54) CONTROL DEVICE, IMAGING DEVICE, IMAGING SYSTEM, MOVABLE OBJECT, CONTROL METHOD, AND PROGRAM

(71) Applicant: SZ DJI TECHNOLOGY CO., LTD., Shenzhen (CN)

(72) Inventor: Kenichi Honjo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 5 days.

(21) Appl. No.: 16/672,095

(22) Filed: Nov. 1, 2019

(65) Prior Publication Data

US 2020/0068128 A1 Feb. 27, 2020

Related U.S. Application Data

(63) Continuation of application No. PCT/JP2017/018109, filed on May 12, 2017.

(51) Int. Cl.
*H04N 5/232* (2006.01)
*H04N 5/225* (2006.01)

(52) U.S. Cl.
CPC ..... *H04N 5/23245* (2013.01); *H04N 5/23267* (2013.01); *H04N 5/23287* (2013.01); *H04N 5/23299* (2018.08); *H04N 5/2253* (2013.01)

(58) Field of Classification Search
CPC ........... H04N 5/23245; H04N 5/23267; H04N 5/23287
See application file for complete search history.

(56) References Cited

U.S. PATENT DOCUMENTS

| | | | | |
|---|---|---|---|---|
| 5,282,044 A | * | 1/1994 | Misawa | H04N 5/23248 348/208.3 |
| 5,587,764 A | * | 12/1996 | Nakamura | G03B 5/00 348/E5.046 |
| 6,044,228 A | * | 3/2000 | Hara | G03B 5/00 396/246 |
| 9,699,382 B2 | * | 7/2017 | Kim | H04N 5/232411 |
| 2003/0231393 A1 | * | 12/2003 | Yamamoto | G02B 27/646 359/557 |
| 2006/0083502 A1 | * | 4/2006 | Higo | H04N 5/23261 396/55 |

(Continued)

FOREIGN PATENT DOCUMENTS

| | | |
|---|---|---|
| JP | 2002300456 A | 10/2002 |
| JP | 2004228809 A | 8/2004 |

(Continued)

OTHER PUBLICATIONS

The World Intellectual Property Organization (WIPO) International Search Report for PCT/JP2017/018109 dated Aug. 8, 2017 3 pages.

*Primary Examiner* — Jonathan R Messmore
(74) *Attorney, Agent, or Firm* — Anova Law Group, PLLC

(57) ABSTRACT

A control device includes a memory storing a program and a processor coupled to the memory and configured to execute the program to detect a driving command supplied to a driving device that changes a position or an orientation of an imaging device, and disable a shake correction function of the imaging device before the driving device starts to change the position or the orientation of the imaging device corresponding to the driving command.

10 Claims, 6 Drawing Sheets

(56) References Cited

U.S. PATENT DOCUMENTS

| | | | | |
|---|---|---|---|---|
| 2011/0158620 A1* | 6/2011 | Kanayama | ............... | G03B 5/00 |
| | | | | 396/55 |
| 2014/0140684 A1* | 5/2014 | Imanishi | .............. | G02B 27/646 |
| | | | | 396/55 |
| 2014/0267805 A1* | 9/2014 | Webb | ................. | H04N 5/23258 |
| | | | | 348/208.2 |
| 2016/0295246 A1* | 10/2016 | Laksono | ................ | H04N 5/247 |
| 2017/0078577 A1* | 3/2017 | Wakamatsu | ....... | H04N 5/23267 |
| 2017/0322551 A1* | 11/2017 | Zang | ..................... | B64D 47/08 |
| 2018/0095459 A1* | 4/2018 | Bachrach | ............. | G05D 1/0094 |

FOREIGN PATENT DOCUMENTS

| | | |
|---|---|---|
| JP | 2011124622 A | 6/2011 |
| JP | 2013078067 A | 4/2013 |
| JP | 2014220597 A | 11/2014 |

\* cited by examiner

CONTROL DEVICE, IMAGING DEVICE, IMAGING SYSTEM, MOVABLE OBJECT, CONTROL METHOD, AND PROGRAM

CROSS-REFERENCE TO RELATED APPLICATION

This application is a continuation of International Application No. PCT/JP2017/018109, filed May 12, 2017, the entire content of which is incorporated herein by reference.

TECHNICAL FIELD

The present disclosure relates to a control device, an imaging device, an imaging system, a movable object, a control method, and a program.

BACKGROUND

Patent Document 1 discloses that a shake correction optical means is operated when it is determined that panning is not carried out.

Patent Document 1: JP-A-2004-228809

When shake correction is disabled after a change in the position or orientation of an imaging device is detected, the imaging device may not be able to take a desired image due to the influence of shake correction during the period from starting changing the position or orientation of the imaging device until shake correction is disabled.

SUMMARY

A control device according to an aspect of the present disclosure may include a detection unit configured to detect a driving command supplied to a driving device that changes the position or orientation of an imaging device. The control device may include a control unit configured to disable a shake correction function of the imaging device before the driving device starts changing the position or orientation of the imaging device according to the driving command detected by the detection unit.

The control unit may enable the shake correction function in response to the driving device having finished changing the position or orientation of the imaging device.

When a zoom position of the imaging device is within a predetermined range, the control unit may disable the shake correction function before the driving device starts changing the position or orientation of the imaging device according to the driving command detected by the detection unit.

The shake correction function may include a first function of shake correction in a first direction of the imaging device and a second function of shake correction in a second direction which is different from the first direction. The control unit may disable at least one of the first function or the second function of shake correction in the changing direction of a moving direction of the imaging device or a direction in which the orientation thereof is changed according to the driving command before the driving device starts changing the position or orientation of the imaging device according to the driving command detected by the detection unit.

The imaging device may have, as the shake correction function, at least one of a function of performing shake correction by moving at least one of an optical system or an image sensor included in the imaging device or a function of performing shake correction of the image processing of an image to be taken.

The driving device may be a support mechanism that supports the imaging device so that the orientation of the imaging device can be changed. The detection unit may detect the driving command supplied to the support mechanism.

The driving device may be a propulsion unit that propels the imaging device. The detection unit may detect the driving command supplied to the propulsion unit.

The driving device may include a support mechanism that supports the imaging device so that the orientation of the imaging device can be changed. The driving device may include a propulsion unit that propels the imaging device. The detection unit may detect the driving command supplied to the support mechanism and the propulsion unit.

An imaging device according to an aspect of the present disclosure may include the control device.

An imaging system according to an aspect of the present disclosure may include the imaging device. The imaging system may include a support mechanism configured to support the imaging device.

A movable object according to an aspect of the present disclosure may include the imaging system and may be configured to move.

A control method according to an aspect of the present disclosure may include a stage of detecting a driving command supplied to a driving device that changes the position or orientation of an imaging device. The control method may include a stage of disabling a shake correction function of the imaging device before the driving device starts changing the position or orientation of the imaging device according to the detected driving command.

A program according to an aspect of the present disclosure may cause a computer to execute a stage of detecting a driving command supplied to a driving device that changes the position or orientation of an imaging device. The program may cause a computer to execute a stage of disabling a shake correction function of the imaging device before the driving device starts changing the position or orientation of the imaging device according to the detected driving command.

According to an aspect of the present disclosure, the imaging device can be prevented from failing to obtain a desired image by carrying out shake correction while the position or orientation of the imaging device is changed.

The above summary of the disclosure does not enumerate all the features of the present disclosure. Sub-combinations of the features may also be embodiments of the disclosure.

DETAILED DESCRIPTION OF THE EMBODIMENTS

Figure 1:
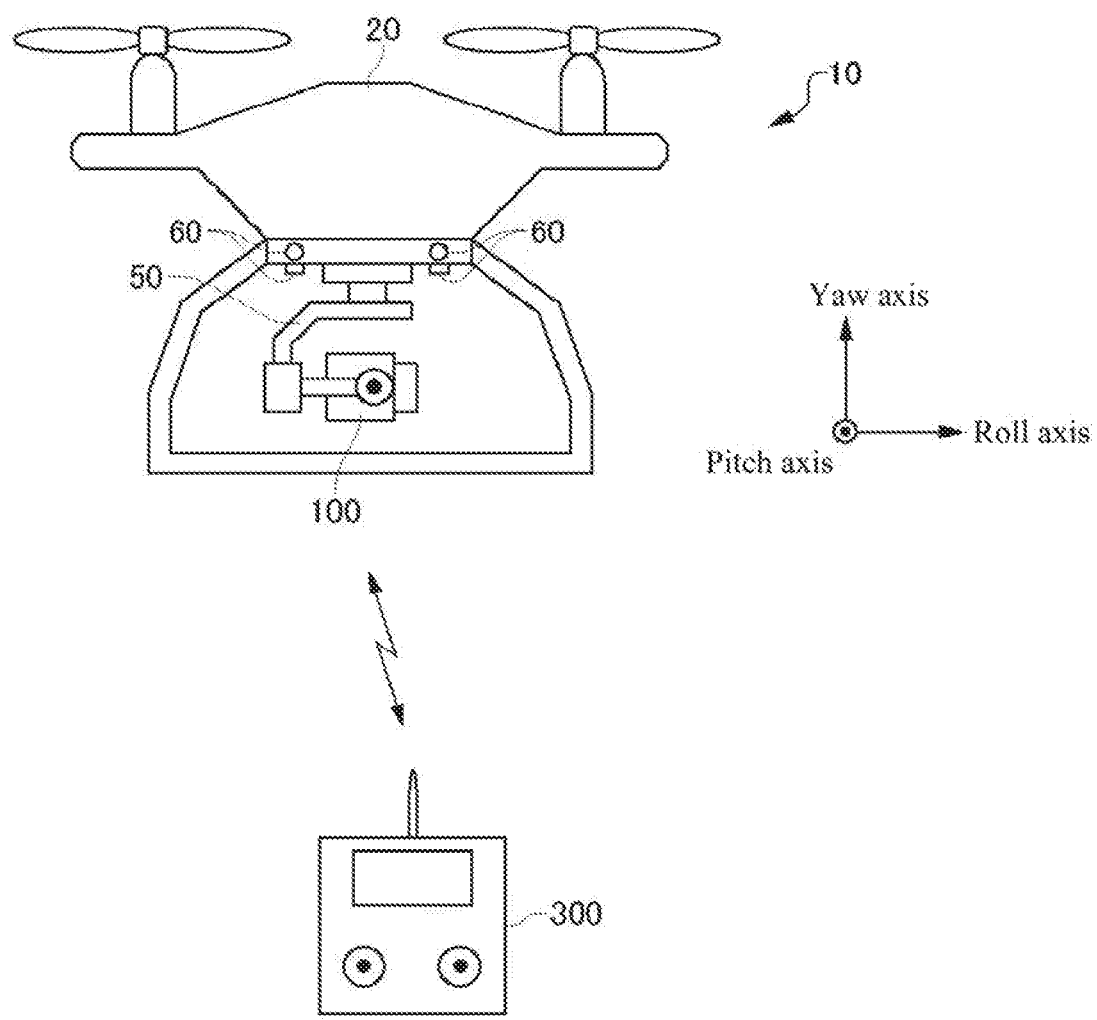
FIG. 1 is a view illustrating an example of the appearances of an unmanned aerial vehicle and a remote control device.

Hereinafter, the present disclosure will be described by way of embodiments of the disclosure, but the following embodiments are not intended to limit the invention according to the claims. Further, all combinations of the features described in the embodiments are not necessarily indispensable to the solution of the disclosure. It is apparent to those skilled in the art that modifications or improvements may be made with regard to the following embodiments. It is apparent from description of the claims that modes with such modifications or improvements may be included in the technical scope of the present disclosure.

The claims, the specification, the drawings, and the abstract include items that are subject to copyright protection. The copyright holder does not object to the copying, by any person, of these documents as long as they appear on the file or record of the Patent Office. However, all copyrights are reserved in all other cases.

Embodiments of the present disclosure may be described with reference to flow charts and block diagrams, in which a block may indicate: (1) a stage of a process in which operations are carried out; or (2) a "unit" of a device that is responsible for carrying out operations. A specific stage and "unit" may be implemented by a programmable circuit and/or a processor. A dedicated circuit may include a digital and/or analogue hardware circuit. An integrated circuit (IC) and/or discrete circuit may also be included. The programmable circuit may include a reconfigurable hardware circuit. The reconfigurable hardware circuit may include logical AND, logical OR, logical XOR, logical NAND, logical NOR, and other logical operations, and memory elements such as a flip-flop, a register, a field programmable gate array (FPGA), and a programmable logic array (PLA).

A computer-readable medium may include any tangible device capable of storing instructions to be executed by a suitable device. As a result, a computer-readable medium having commands stored therein includes a product containing commands that may be executed to create means for carrying out operations specified in flow charts or block diagrams. Examples of a computer-readable medium may include an electronic storage medium, a magnetic storage medium, an optical storage medium, an electromagnetic storage medium, a semiconductor storage medium, and the like. More specific examples of a computer readable medium may include a Floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disc (DVD), a Blu-ray® disc, a memory stick, an integrated circuit card, and the like.

A computer-readable command may include any source code or object code recorded in any combination of one or more programming languages. The source code or object code includes a conventional procedural programming language. The conventional procedural programming language may be an assembler instruction, an instruction set architecture (ISA) instruction, a machine instruction, a machine-dependent instruction, a microcode, a firmware instruction, state setting data, an object-oriented programming language such as Smalltalk, JAVA (registered trademark), C++, and a "C" programming language or a similar programming language. The computer-readable command may be provided to a processor or a programmable circuit of a general purpose computer, a special purpose computer, or other programmable data processing devices locally or via a wide area network (WAN) such as a local area network (LAN), the Internet, and the like. The processor or the programmable circuit may execute computer-readable commands to create means for carrying out operations specified in flow charts or block diagrams. Examples of the processor include a computer processor, a processing unit, a microprocessor, a digital signal processor, a controller, a micro controller, and the like.

FIG. 1 illustrates an example of the appearances of an unmanned aerial vehicle (UAV) 10 and a remote control device 300. The UAV 10 includes a UAV main body 20, a gimbal 50, a plurality of imaging devices 60, and an imaging device 100. The gimbal 50 and the imaging device 100 are an example of an imaging system. The UAV 10 is an example of a movable object propelled by a propulsion unit. The movable object refers to a concept including, in addition to a UAV, a flying object such as another aircraft moving in the air, a vehicle moving on the ground, a ship moving on water, and the like.

The UAV main body 20 includes a plurality of rotor blades. The plurality of rotor blades is an example of a propulsion unit. The UAV main body 20 controls the rotation of the plurality of rotor blades to cause the UAV 10 to fly. For example, the UAV main body 20 causes the UAV 10 to fly using four rotor blades. The number of rotor blades is not limited to four. Further, the UAV 10 may also be a fixed-wing aircraft without rotor blades.

The imaging device 100 is a camera for imaging a subject within a desired imaging range. The gimbal 50 supports the imaging device 100 so that the orientation of the imaging device 100 can be changed. The gimbal 50 supports the imaging device 100 such that same can rotate. The gimbal 50 is an example of a support mechanism. For example, the gimbal 50 supports, by using an actuator, the imaging device 100 such that same can rotate around a pitch axis. The gimbal 50 supports, by using the actuator, the imaging device 100 such that same can further rotate around a roll axis and a yaw axis. The gimbal 50 rotates the imaging device 100 around at least one of the yaw axis, the pitch axis, or the roll axis so that the orientation of the imaging device 100 may be changed.

The plurality of imaging devices 60 is a sensing camera for imaging the surroundings of the UAV 10 to control flight of the UAV 10. Two imaging devices 60 may be provided on a front surface, i.e., the nose, of the UAV 10. Another two imaging devices 60 may be provided on a bottom surface of the UAV 10. The two imaging devices 60 on the front side are paired and may function as a so-called stereo camera. The two imaging devices 60 on the bottom side are also paired and may function as a so-called stereo camera. Three-dimensional spatial data around the UAV 10 may be generated based on images taken by the plurality of imaging devices 60. The number of imaging devices 60 included in the UAV 10 is not limited to four. The UAV 10 may include at least one imaging device 60. The UAV 10 may include at least one imaging device 60 on each of the nose, a tail, a lateral surface, the bottom surface, and a ceiling surface of the UAV 10. An angle of view that can be set by the imaging devices 60 may be larger than an angle of view that can be set by the imaging device 100. That is, the imaging range of the imaging devices 60 may be wider than the imaging range of the imaging device 100. The imaging device 60 may include a single-focus lens or a fish eye lens.

The remote control device 300 communicates with the UAV 10 and remotely controls the UAV 10. The remote control device 300 may communicate with the UAV 10 in a wireless manner. The remote control device 300 transmits, to the UAV 10, driving information related to the movement of the UAV 10, such as an upward movement, downward movement, acceleration, deceleration, forward movement, backward movement, and rotation. The driving information includes, for example, driving information for increasing the altitude of the UAV 10. The driving information may indicate the altitude at which the UAV 10 should be located. The UAV 10 may move so as to be located at an altitude indicated by the driving information received from the remote control device 300, and may hover and remain in that position when the desired altitude is reached. When the UAV 10 does not receive, during flight, driving information related to a movement including upward movement, downward movement, acceleration, deceleration, forward movement, backward movement, and rotation, same may hover and remain in that position until driving information related to a new movement is received.

Figure 2:
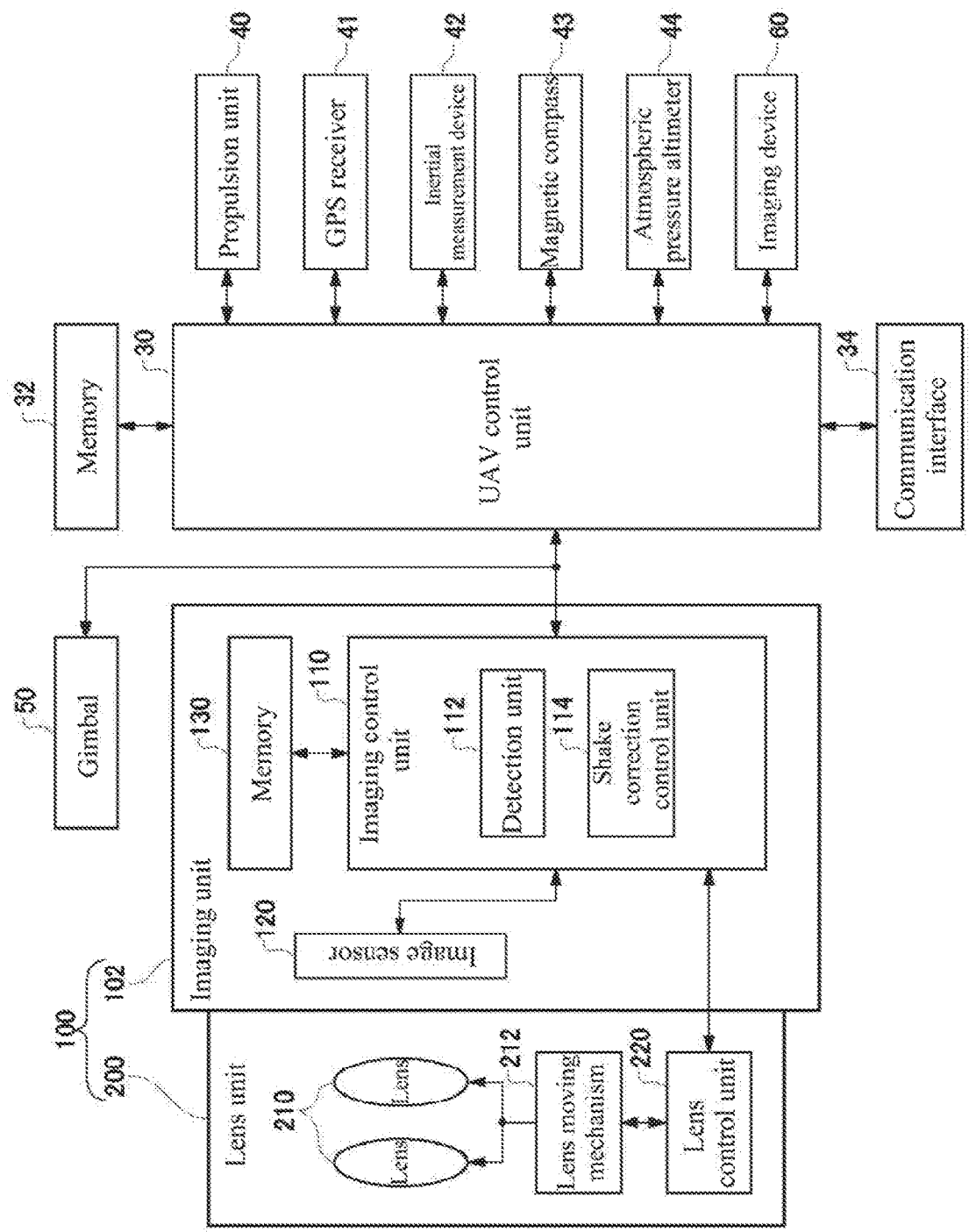
FIG. 2 is a diagram illustrating an example of functional blocks of an unmanned aerial vehicle.

FIG. 2 illustrates an example of functional blocks of the UAV 10. The UAV 10 includes a UAV control unit 30, a memory 32, a communication interface 34, a propulsion unit 40, a GPS receiver 41, an inertial measurement unit 42, a magnetic compass 43, an atmospheric pressure altimeter 44, the gimbal 50, the imaging devices 60, and the imaging device 100.

The communication interface 34 communicates with another device, such as the remote control device 300. The communication interface 34 may receive driving information regarding the UAV control unit 30 from the remote control device 300. The driving information includes driving information related to the movement of the UAV 10 and driving information related to the driving of the gimbal 50. The memory 32 stores programs and the like necessary for the UAV control unit 30 to control the propulsion unit 40, the GPS receiver 41, the inertial measurement unit (IMU) 42, the magnetic compass 43, the atmospheric pressure altimeter 44, the gimbal 50, the imaging devices 60, and the imaging device 100. The memory 32 may be a computer-readable recording medium and may include at least one of an SRAM, a DRAM, an EPROM, an EEPROM, or a flash memory, such as a USB memory. The memory 32 may be provided inside the UAV main body 20. The memory may be provided such that same can be removed from the UAV body 20.

The UAV control unit 30 controls the flight and imaging of the UAV 10 according to a program stored in the memory 32. The UAV control unit 30 controls the gimbal 50 according to the program stored in the memory 32 so as to control the orientation of the imaging device 100. The UAV control unit 30 may be configured by a microprocessor such as a CPU or an MPU and a micro controller such as an MCU. The UAV control unit 30 generates a driving command for driving the propulsion unit 40 or the gimbal 50 based on driving information received from the remote control device 300 via the communication interface 34. The propulsion unit 40 propels the UAV 10. The propulsion unit 40 includes a plurality of rotor blades and a plurality of drive motors for rotating the plurality of rotor blades. The propulsion unit 40 rotates the plurality of rotor blades via the plurality of drive motors according to the driving command from the UAV control unit 30, and causes the UAV 10 to fly. The gimbal 50 rotates the imaging device 100 around at least one of the pitch axis, the roll axis, or the yaw axis via the actuator according to the driving command from the UAV control unit 30, and changes the orientation of the imaging device 100.

The UAV control unit 30 may specify the environment around the UAV 10 by analyzing a plurality of images taken by the plurality of imaging devices 60 for sensing. Based on the environment around the UAV 10, the UAV control unit 30, for example, avoids obstacles and controls the flight of the UAV 10. The UAV control unit 30 may generate three-dimensional spatial data around the UAV 10 based on a plurality of images taken by the plurality of imaging devices 60, and control the flight of the UAV 10 based on the three-dimensional spatial data.

The GPS receiver 41 receives a plurality of signals, indicating times, transmitted from a plurality of GPS satellites. The GPS receiver 41 calculates the position of the GPS receiver 41, that is, the position of the UAV 10, based on the received plurality of signals. The IMU 42 detects a posture of the UAV 10. The IMU 42 detects acceleration in front-rear, left-right, and up-down axial directions and angular velocities in the three axial directions of the pitch, the roll, and the yaw of the UAV 10 to be the attitude of the UAV 10. The magnetic compass 43 detects the bearing of the nose of the UAV 10. The atmospheric pressure altimeter 44 detects the altitude at which the UAV 10 is flying. The atmospheric pressure altimeter 44 detects the altitude by detecting atmospheric pressure around the UAV 10 and converting the detected atmospheric pressure into altitude.

The imaging device 100 is an imaging device having a shake correction function, and includes an imaging unit 102 and a lens unit 200. The lens unit 200 is an example of a lens device.

The lens unit 200 includes a plurality of lenses 210, a lens moving mechanism 212, and a lens control unit 220. The plurality of lenses 210 may function as a zoom lens, a varifocal lens, and a focus lens. At least a part or all of the plurality of lenses 210 are movably arranged along an optical axis. The lens unit 200 may be an interchangeable lens detachably provided with regard to the imaging unit 102. The lens moving mechanism 212 moves at least a part or all of the plurality of lenses 210 along the optical axis. The lens control unit 220 drives the lens moving mechanism 212 according to a lens control command from the imaging unit 102 so as to move one or more lenses 210 along an optical axis direction. The lens control command is, for example, a zoom control command and a focus control command.

The imaging unit 102 includes an image sensor 120, an imaging control unit 110, and a memory 130. The image sensor 120 may be configured by a CCD or a CMOS. The image sensor 120 outputs image data of an optical image formed via the plurality of lenses 210 to the imaging control unit 110.

The memory 130 may be a computer-readable recording medium and may include at least one of an SRAM, a DRAM, an EPROM, an EEPROM, or a flash memory such as a USB memory. The memory 130 stores programs necessary for the imaging control unit 110 to control the image sensor 120 and the like. The memory 130 may be provided inside the housing of the imaging device 100. The memory 130 may be provided such that same can be removed from the housing of the imaging device 100.

The imaging control unit 110 may be configured by a microprocessor such as a CPU or an MPU and a microcontroller. such as an MCU. The imaging control unit 110 may control the imaging device 100 in response to an operation 1 command for the imaging device 100 from the UAV control unit 30. The imaging control unit 110 includes a detection unit 112 and a shake correction control unit 114. The detection unit 112 detects a driving command supplied to the propulsion unit 40 or the gimbal 50 which changes the position or orientation of the imaging device 100. The propulsion unit 40 and the gimbal 50 are examples of a driving device. The detection unit 112 may determine that a driving command is detected when the UAV control unit 30 has supplied a driving command generated based on driving information received from the remote control device 300, to the propulsion unit 40 or the gimbal 50, or when the UAV control unit 30 detects that the driving command is generated. The detection unit 112 may determine that the driving command is detected when it is detected that the UAV 10 has received driving information which is related to the movement of the UAV 10 or the driving of the gimbal 50 and which is transmitted from the remote control device 300.

The shake correction control unit 114 performs a shake correction function. The shake correction control unit 114 is an example of a control unit. The shake correction function is a function of suppressing the occurrence of image shaking due to the vibration of the imaging device 100. The shake correction function may be a so-called camera shake correction function. The imaging device 100 may have, as the shake correction function, at least one of a function of performing shake correction by moving at least one of the lens 210 or the image sensor 120 in a shaking direction, or a function of performing shake correction of the image processing of an image to be taken.

The lens moving mechanism 212 may perform shake correction by moving at least a part or all of the plurality of lenses 210 along the optical axis direction or a direction perpendicular to the optical axis with respect to the shake direction of the imaging device 100 according to with an operation instruction from the shake correction control unit 114. The imaging device 100 may include a moving mechanism that moves the image sensor 120 in at least one of the optical axis direction or the direction perpendicular to the optical axis. The shake correction control unit 114 may perform shake correction by controlling the moving mechanism of the image sensor 120 and moving the image sensor 120 in at least one of the optical axis direction or the direction perpendicular to the optical axis in response to the vibration of the imaging device 100. The shake correction control unit 114 may perform shake correction by cutting out the same image area from each image obtained from the image sensor 120 and using each cut out image.

In the imaging device 100 configured as described above, a desired image may not be obtained by the imaging device 100 when shake correction is performed during the movement of the UAV 10 or during the driving of the gimbal 50.

Therefore, the shake correction control unit 114 disables the shake correction function of the imaging device 100 before the change of the position or orientation of the imaging device 100 is started via the movement of the UAV 10 or the driving of the gimbal 50 according to the driving command detected by the detection unit 112. In this way, shake correction is performed during the movement of the UAV 10 or the driving of the gimbal 50, thereby preventing the imaging device 100 from failing to obtain a desired image.

When the detection unit 112 detects that the UAV control unit 30 has supplied a driving command generated based on driving information received from the remote control device 300 to the propulsion unit 40 or the gimbal 50, the shake correction control unit 114 may disable the shake correction function before the change of the position or orientation of the imaging device 100 is started according to the driving command. When the detection unit 112 detects that the UAV control unit 30 has generated a driving command, the shake correction control unit 114 may disable the shake correction function before the change of the position or orientation of the imaging device 100 is started in accordance with the driving command. When detecting that the UAV 10 has received driving information related to the movement of the UAV 10 or the drive of the gimbal 50 transmitted from the remote control device 300, the shake correction control unit 114 may disable the shake correction function before the change of the position or orientation of the imaging device 100 is started according to the driving command based on the driving information.

The shake correction control unit 114 may enable the shake correction function in response to the propulsion unit 40 or the gimbal 50 having finished changing the position or orientation of the imaging device 100. The shake correction control unit 114 may enable the shake correction function in response to the propulsion unit 40 or the gimbal 50 having finished changing the position or orientation of the imaging device 100 and UAV 10 having shifted to a hovering operation. When a zoom position of the imaging device 100 is within a predetermined range, the shake correction control unit 114 may disable the shake correction function before the propulsion unit 40 or the gimbal 50 starts changing the position or orientation of the imaging device 100 according to the driving command detected by the detection unit 112. The range of the zoom position of the imaging device 100 may include, for example, a first range at a near-end side and a second range at a far-end side. When the zoom position of the imaging device 100 is within a second range on a telephoto-end side, it is likely that the shake correction function is carried out while the position or orientation of the imaging device 100 is changed. Therefore, when the zoom position of the imaging device 100 is within the second range of a telephoto-end type, the shake correction control unit 114 may disable the shake correction function before the propulsion unit 40 or the gimbal 50 starts changing the position or orientation of the imaging device 100 according to the driving command detected by the detection unit 112.

The shake correction control unit 114 may perform shake correction in a plurality of directions. The shake correction control unit 114 may disable a function of shake correction in the moving direction of the imaging device 100 or the direction in which the orientation thereof is changed d according to the driving command before the propulsion unit 40 or the gimbal 50 starts changing the position or orientation of the imaging device 100 according to the driving command detected by the detection unit 112.

The shake correction function may include a first function of shake correction in a first direction of the imaging device 100 and a second function of shake correction in a second direction which is different from the first direction. The shake correction function may include a first function of shake correction in a first direction perpendicular to an optical axis of the imaging device 100, and a second function of shake correction in a second direction perpendicular to the optical axis and the second direction. The shake correction control unit 114 may disable at least one of the first or the second function of shake correction in the moving direction of the imaging device 100 or the direction in which the orientation thereof is changed according to the driving command before the propulsion unit 40 or the gimbal 50 starts changing the position or orientation of the imaging device 100 according to the driving command detected by the detection unit 112.

In addition to the first function and the second function, the shake correction function may include a third function of shake correction in a third direction along the optical axis. In this case, the shake correction control unit 114 may disable at least one of the first function, the second function, or the third function of shake correction in the moving direction of the imaging device 100 or the direction in which the orientation thereof is changed according to the driving command before the propulsion unit 40 or the gimbal 50 starts changing the position or orientation of the imaging device 100 according to the driving command detected by the detection unit 112.

Figure 3:
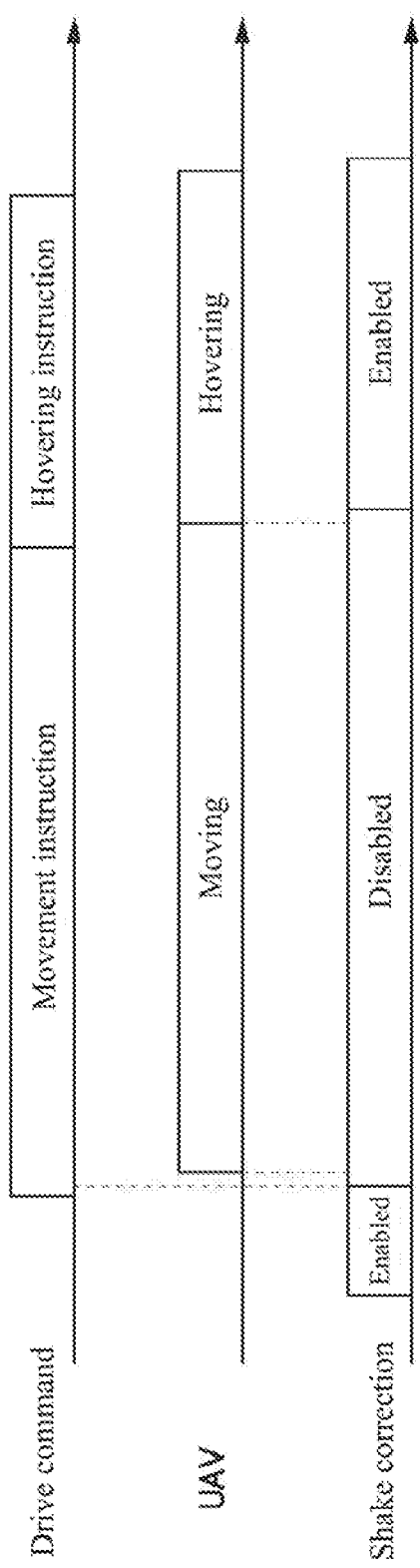
FIG. 3 is a diagram for explaining the timing of invalidation of a shake correction function.

FIG. 3 is a diagram for explaining the detection of the driving command, the movement of the UAV 10, and the timing of validation and validation of shake correction. For example, when the detection unit 112 detects a driving command indicating a movement instruction for the UAV 10, the shake correction control unit 114 switches the shake correction function from a valid state to an invalid state before the UAV 10 starts moving according to the driving command. Thereafter, when the detection unit 112 does not detect a driving command indicating a movement instruction for the UAV 10, and the UAV control unit 30 supplies a driving command indicating a hovering instruction to the propulsion unit 40, the UAV 10 starts hovering. In this case, the detection unit 112 detects that the UAV 10 is hovering based on the driving command supplied to the propulsion unit 40. When the detection unit 112 detects that the UAV 10 is hovering, the shake correction control unit 114 switches the shake correction function from the disabled state to the valid state.

The shake correction control unit 114 continuously disables the shake correction function while the movement or orientation of the imaging device 100 is changed by the propulsion unit 40 or the gimbal 50. Therefore, the imaging device 100 can be prevented from failing to obtain a desired image by performing shake correction while the movement or orientation of the imaging device 100 is changed by the propulsion unit 40 or the gimbal 50.

Figure 4:
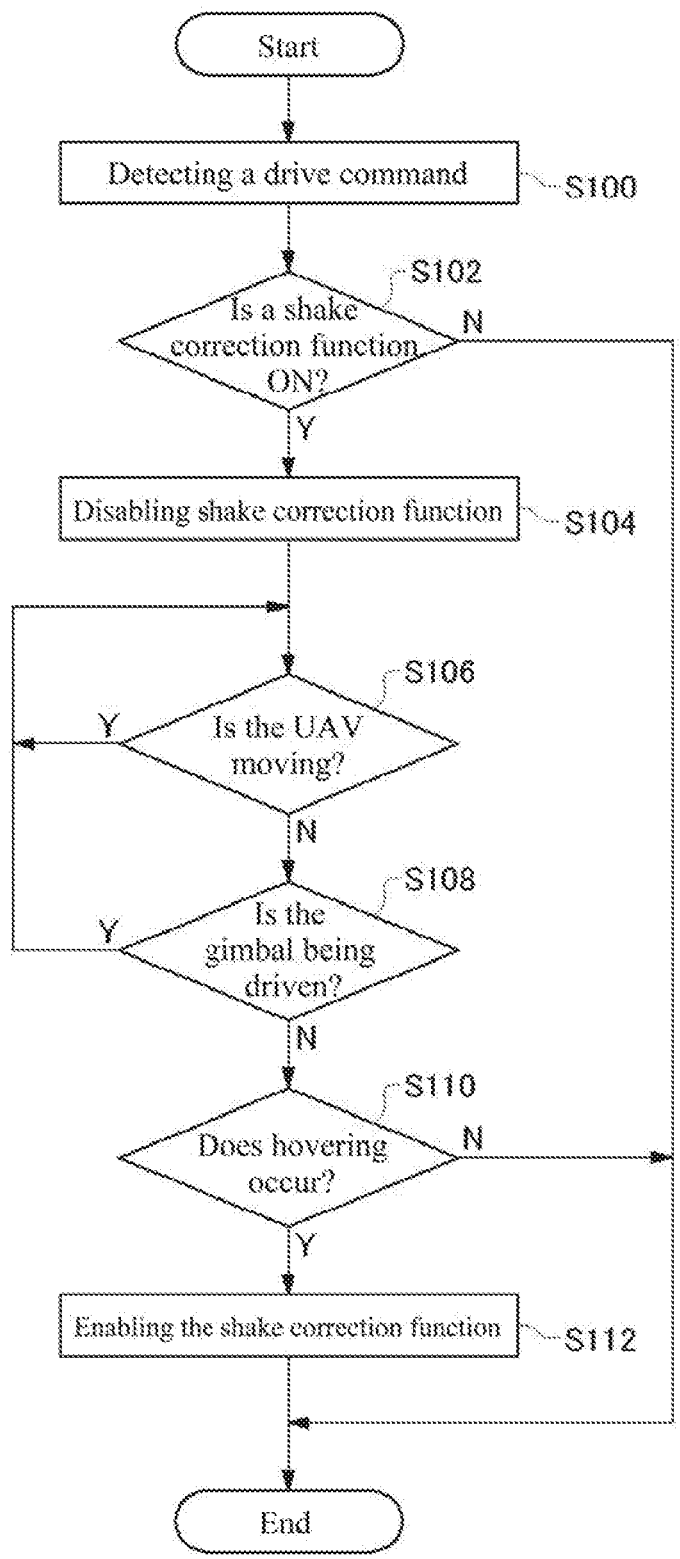
FIG. 4 is a flow chart illustrating an example of processing procedures for disabling the shake correction function.

FIG. 4 is a flow chart illustrating an example of processing procedures for disabling the shake correction function. The detection unit 112 detects a driving command for driving the propulsion unit 40 or the gimbal 50 to change the movement of the UAV 10 or the orientation of the imaging device 100 (S 100). For example, the detection unit 112 may detect that the UAV control unit 30 supplies a driving command to the propulsion unit 40 or the gimbal 50 to move the UAV 10 or change the orientation of the imaging device 100 based on the driving information from the remote control device 300. For example, the detection unit 112 may detect driving information from the remote control device 300 to be a driving command.

When the detection unit 112 detects a driving command, the shake correction control unit 114 determines whether the shake correction function is ON or OFF (S 102). The shake correction control unit 114 may determine whether the shake correction function is ON or OFF based on an imaging condition under an imaging mode of the imaging device 100, an imaging condition set by a user, and the like.

If the shake correction function is OFF, the shake correction control unit 114 ends the processing for disabling the shake correction function. On the other hand, if the shake correction function is ON, the shake correction control unit 114 disables the shake correction function before the propulsion unit 40 or the gimbal 50 starts changing the position or orientation of the imaging device 100 (S 104).

Thereafter, the shake correction control unit 114 determines whether the UAV 10 is moving (S 106) and whether the gimbal 50 is being driven (S 108) based on the driving command supplied from the UAV control unit 30 to the propulsion unit 40 or the gimbal 50. If the UAV 10 is moving or the gimbal 50 is being driven, the shake correction control unit 114 continuously disables the shake correction function. On the other hand, if the UAV 10 is not moving and the gimbal 50 is not driven, the shake correction control unit 114 determines whether the UAV 10 is hovering based on the driving command supplied from the UAV control unit 30 to the propulsion unit 40 (S 110). If the UAV is not hovering, the shake correction control unit 114 ends the processing while disabling the shake correction function. In this case, the shake correction control unit 114 may turn the shake correction function on according to an imaging condition before the UAV 10 starts flying next time.

If the UAV 10 is hovering, the shake correction control unit 114 enables the shake correction function and ends the processing (S 112).

As described above, according to the imaging device 100 according to the present embodiment, the shake correction function is disabled before the change of the position or orientation of the imaging device 100 is started. Therefore, the imaging device 100 can be prevented from failing to obtain a desired image by carrying out the shake correction function while the movement or orientation of the imaging device 100 is changed.

Figure 5:
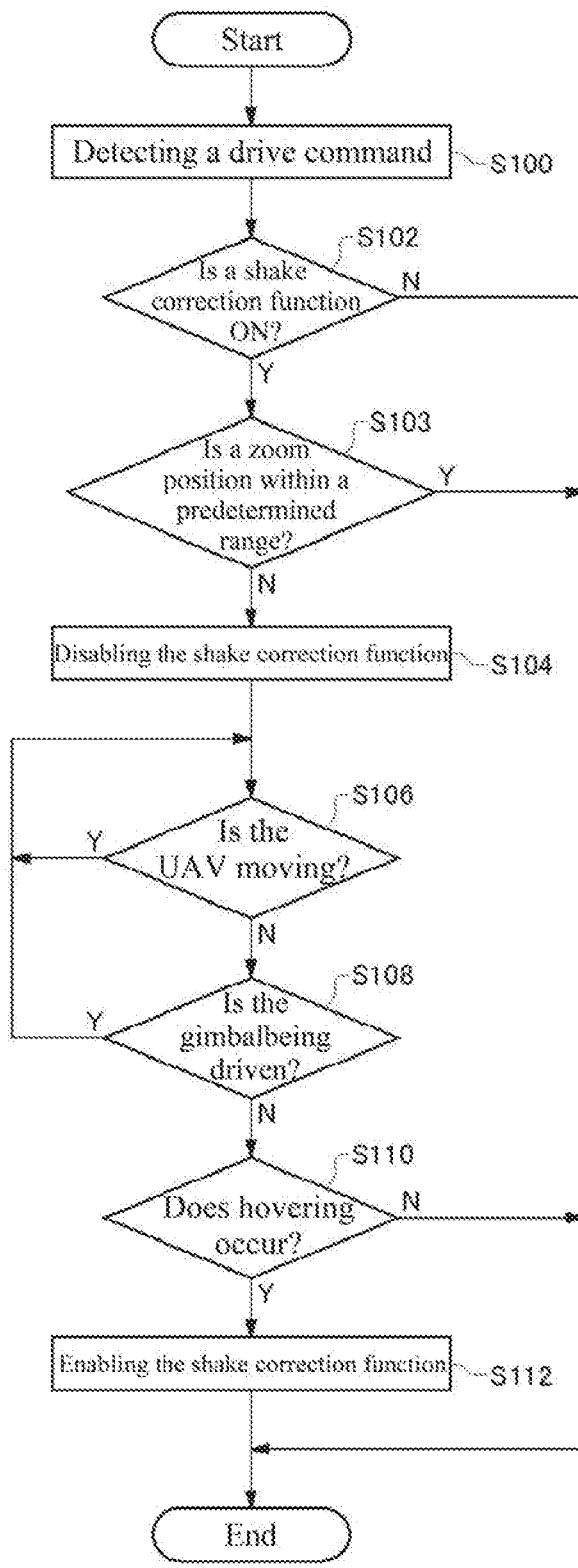
FIG. 5 is a flow chart illustrating an example of processing procedures for disabling the shake correction function.

FIG. 5 is a flow chart illustrating an example of processing procedures for disabling the shake correction function. The flow chart illustrated in FIG. 5 differs from the flow chart illustrated in FIG. 4 in that judgment of the zoom position is added in step S 103.

The detection unit 112 detects a driving command for driving the propulsion unit 40 or the gimbal 50 (S 100). When the detection unit 112 detects a driving command, the shake correction control unit 114 determines whether the shake correction function is ON or OFF (S 102). If the shake correction function is OFF, the shake correction control unit 114 ends the processing for disabling the shake correction function. On the other hand, if the shake correction function is ON, the shake correction control unit 114 determines whether the position of a lens of the lens unit 200 is within a predetermined range (S 103). The shake correction control unit 114 may determine whether the position of a lens of the lens unit 200 is within a predetermined range at a telephoto-end side. If the position of a lens of the lens unit 200 is within a predetermined range on a near-end side, the shake correction control unit 114 ends the processing for disabling the shake correction function.

On the other hand, if the position of a lens of the lens unit 200 is within a predetermined range on the telephoto-end side, the shake correction control unit 114 disables the shake correction function before the propulsion unit 40 or the gimbal 50 starts changing the position or orientation of the imaging device 100 (S 104).

Thereafter, the shake correction control unit 114 determines whether the UAV 10 is moving (S 106) and whether the gimbal 50 is being driven (S 108) based on the driving command supplied from the UAV control unit 30 to the propulsion unit 40 or the gimbal 50. If the UAV 10 is moving or the gimbal 50 is being driven, the shake correction control unit 114 continuously disables the shake correction function. On the other hand, if the UAV 10 is not moving and the gimbal 50 is not driven, the shake correction control unit 114 determines whether the UAV 10 is hovering based on the driving command supplied from the UAV control unit 30 to the propulsion unit 40 (S 110). If the UAV is not hovering, the shake correction control unit 114 ends the processing while disabling the shake correction function.

If the UAV 10 is hovering, the shake correction control unit 114 enables the shake correction function and ends the processing (S 112).

As described above, it may be determined whether the shake correction function is disabled according to the zoom position of a lens. For example, when the zoom position of the lens is on the near-end side, the possibility of performing shake correction is low, or even if shake correction is carried out, the influence on the image is small. Therefore, even if the shake correction function is disabled, the effect on the image is small. Therefore, if the zoom position is within a predetermined range, since the shake correction function is not disabled, the shake correction control unit 114 can prevent unnecessary processing from being carried out.

Figure 6:
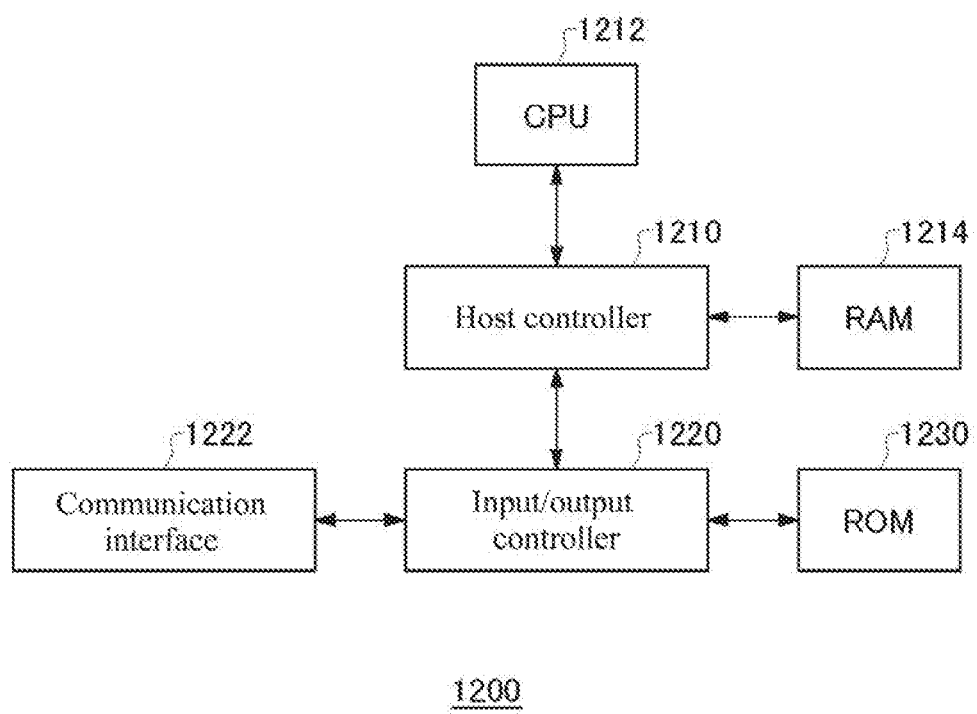
FIG. 6 is a diagram illustrating an example of a hardware configuration.

FIG. 6 illustrates an example of a computer 1200 in which a plurality of modes of the present disclosure may be embodied in whole or in part. A program installed on the computer 1200 can cause the computer 1200 to function as an operation associated with a device according to the embodiment of the disclosure or as one or more "units" of the device. Alternatively, the program can cause the computer 1200 to carry out the operation or implement the one or more "units". The program can cause the computer 1200 to perform a process according to the embodiment of the present disclosure or a stage of the process. Such a program may be executed by a CPU 1212 to cause the computer 1200 to perform a specific operation associated with some or all blocks of the flow charts and block diagrams described herein.

The computer 1200 according to the present embodiment includes the CPU 1212 and an RAM 1214 which are interconnected by a host controller 1210. The computer 1200 also includes a communication interface 1222 and an input/output unit which are connected to the host controller 1210 via an input/output controller 1220. The computer 1200 also includes an ROM 1230. The CPU 1212 operates according to a program stored in the ROM 1230 and the RAM 1214, thereby controlling each unit.

The communication interface 1222 communicates with another electronic device via a network. A hard disk drive may store a program and data to be used by the CPU 1212 in the computer 1200. Depending on hardware of the computer 12, the ROM 1230 stores a boot program and the like to be executed via the computer 1200 during activation and/or a program. The program is provided via a computer-readable recording medium, such as a CD-ROM, a USB memory, or an IC card, or a network. The program is installed in the RAM 1214 or the ROM 1230, which are also examples of a computer-readable recording medium, and is executed by the CPU 1212. Information processing recorded in the program is read by the computer 1200 so as to cause the coordination between the program and the various types of hardware resources. The device or the method may be configured to implement information operation or processing according to the use of the computer 1200.

For example, when communication is carried out between the computer 1200 and an external device, the CPU 1212 may execute a communication program loaded in the RAM 1214, and instruct the communication interface 1222 to perform communication processing based on the processing recorded in the communication program. The communication interface 1222 reads, under the control of the CPU 1212, transmission data stored in a transmission buffer area that is provided in a recording medium such as the RAM 1214 or a USB memory transmits the read transmission data to a network, or writes the data received from the network to a reception buffer area provided on the recording medium.

Further, the CPU 1212 may execute various types of processing on data in the RAM 1214 so that all or the necessary parts of a file or a database stored in an external recording medium such as a USB memory is read into the RAM 1214. Next, the CPU 1212 may write back the processed data to the external recording medium.

Various types of information, such as various types of programs, data, tables, and databases, may be stored on a recording medium and are subject to information processing. The CPU 1212 may carry out various types of processing, including various types of operations, information processing, conditional judgment, conditional branching, unconditional branching, searching for/replacing information, etc., as described elsewhere in this disclosure and specified by a program instruction sequence, on the data read from the RAM 1214 and write results back to the RAM 1214. Further, the CPU 1212 may search for information in a file, a database, and the like in a recording medium. For example, when a plurality of entries, each having an attribute value of a first attribute associated with an attribute value of a second attribute, are stored in a recording medium, the CPU 1212 may search, in the plurality of entries, for an entry matching a condition whereby an attribute value of a first attribute is specified, and read an attribute value of a second attribute stored in the entry, thereby acquiring the attribute value of the second attribute associated with the first attribute that satisfies a predetermined condition.

The program or software module described above may be stored on a computer-readable recording medium on the computer 1200 or near the computer 1200. Further, a recording medium such as a hard disk or a RAM provided in a dedicated communication network or a server system connected to the Internet may be used as a computer-readable storage medium, thereby providing the program to the computer 1200 via a network.

It should be noted that the order of performing each instance of processing, such as an operation, a procedure, a step, and a stage in a device, a system, a program, and a method shown in the claims, the specification, and the drawings may be implemented in any order unless otherwise indicated by "before" and "prior", etc., or that the output of the previous instance of processing is not used in subsequent processing. Even if the operation flows in the claims, the specification, and the drawings are described using "first", "next", and the like for the sake of convenience, it does not mean that this order is necessary.

DESCRIPTION OF THE REFERENCE NUMERALS

10 UAV
20 UAV main body
30 UAV control unit
32 Memory
34 Communication interface
40 Propulsion unit
41 GPS receiver
42 Inertial measurement unit
43 Magnetic compass
44 Atmospheric pressure altimeter
50 Gimbal
60 Imaging device
100 Imaging device
102 Imaging unit
110 Imaging control unit
112 Detection unit
114 Shake correction control unit
120 Image sensor
130 Memory
200 Lens unit 210 Lens
212 Lens moving mechanism
220 Lens control unit
300 Remote control device
1200 Computer
1210 Host controller
1212 CPU
1214 RAM
1220 Input/output controller
1222 Communication interface
1230 ROM

What is claimed is:

1. A control device, comprising:
a memory storing a program; and
a processor coupled to the memory and configured to execute the program to:
 detect a driving command supplied to a propulsion unit of an unmanned aerial vehicle (UAV), the driving command instructing to change an altitude of the UAV, and the UAV being configured to support an imaging device through a gimbal and to change at least one of a position or an orientation of the imaging device when the propulsion unit of the UAV moves the UAV according to the driving command to change the altitude of the UAV; and
 before the propulsion unit of the UAV starts to move the UAV to change the altitude of the UAV according to the driving command, disable a camera shake correction function of the imaging device.

2. The control device of claim 1, wherein the processor is further configured to execute the program to enable the camera shake correction function in response to the propulsion unit of the UAV having finished moving the UAV to change the altitude of the UAV.

3. The control device of claim 1, wherein the processor is further configured to execute the program to, in response to a zoom position of the imaging device being within a predetermined range, disable the camera shake correction function before the propulsion unit of the UAV starts to move the UAV to change the altitude of the UAV according to the driving command.

4. The control device of claim 1, wherein:
the camera shake correction function includes a first function of camera shake correction in a first direction of the imaging device and a second function of camera shake correction in a second direction different from the first direction; and
the processor is further configured to execute the program to, before the propulsion unit of the UAV starts to move the UAV to change the altitude of the UAV according to the driving command, disable at least one of the first function or the second function in a moving direction of the imaging device or in a direction in which the orientation of the imaging device is changed according to the driving command.

5. The control device of claim 1, wherein the camera shake correction function includes at least one of:
a function of performing camera shake correction by moving at least one of an optical system or an image sensor of the imaging device, or
a function of performing camera shake correction of an image to be taken.

6. The control device of claim 1, wherein the processor is further configured to execute the program to receive the driving command from a remote control device.

7. An imaging system comprising:
an imaging device; and
a gimbal configured to support the imaging device;
wherein the imaging device includes a control device including:
 a memory storing a program; and
 a processor coupled to the memory and configured to execute the program to:
  detect a driving command supplied to a propulsion unit of an unmanned aerial vehicle (UAV), the driving command instructing to change an altitude of the UAV, and the UAV being configured to support the imaging device through the gimbal and to change at least one of a position or an orientation of the imaging device when the propulsion unit of the UAV moves the UAV according to the driving command to change the altitude of the UAV; and
  before the propulsion unit of the UAV starts to move the UAV to change the altitude of the UAV according to the driving command, disable a camera shake correction function of the imaging device.

8. A movable object comprising:
an imaging system including:
 an imaging device; and
 a gimbal configured to support the imaging device;
 wherein the imaging device includes a control device including:
  a memory storing a program; and
  a processor coupled to the memory and configured to execute the program to:
   detect a driving command supplied to a propulsion unit of the movable object, the driving command instructing to change an altitude of the movable object, and the movable object being configured to support the imaging device through the gimbal and to change at least one of a position or an orientation of the imaging device when the propulsion unit of the movable object moves the movable object according to the driving command to change the altitude of the movable object; and
   before the propulsion unit of the movable object starts to move the movable object to change the altitude of the movable object according to the driving command, disable a camera shake correction function of the imaging device;
wherein the movable object is configured to move.

9. The movable object of claim 8, wherein the processor is further configured to execute the program to determine, based on the driving command, whether to control the movable object to move or to control the gimbal to move.

10. The movable object of claim 8, wherein:
the movable object is an unmanned aerial vehicle; and
the processor is further configured to execute the program to determine, based on the driving command, whether to control the unmanned aerial vehicle to hover.

* * * * *